(12) United States Patent
Melzer et al.

(10) Patent No.: US 7,498,598 B2
(45) Date of Patent: Mar. 3, 2009

(54) SYSTEM FOR READING OUT X-RAY INFORMATION STORED IN A PHOSPHOR LAYER

(75) Inventors: Volker Melzer, Munich (DE); Christian Bommer, Munich (DE); Johannes Hoelzl, Grasbrunn (DE); Armando De Felice, Buch am Buchrain (DE); Sibylle von Ruecker, Graefelfing (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 241 days.

(21) Appl. No.: 11/079,653

(22) Filed: Mar. 14, 2005

(65) Prior Publication Data
US 2005/0218355 A1 Oct. 6, 2005

(30) Foreign Application Priority Data
Apr. 2, 2004 (EP) .................... 04101370

(51) Int. Cl.
*G03B 42/08* (2006.01)
(52) U.S. Cl. .............. 250/589; 250/581; 250/582; 250/583; 250/584; 250/585
(58) Field of Classification Search .............. 250/589, 250/585, 586, 591
See application file for complete search history.

(56) References Cited

U.S. PATENT DOCUMENTS 5,218,383 A * 6/1993 Kondou et al. .............. 347/130
5,440,146 A * 8/1995 Steffen et al. ............... 250/580
6,473,205 B1 * 10/2002 Pepe .......................... 358/483
6,570,957 B2 * 5/2003 Fuchs et al. ................ 378/98.2
2002/0117640 A1 * 8/2002 Akimoto et al. ............. 250/585
2003/0160196 A1 * 8/2003 Yasuda et al. ............... 250/589
2004/0004871 A1 * 1/2004 Stahl et al. .................. 365/200

FOREIGN PATENT DOCUMENTS

| EP | 0479153 | 4/1992 |
| EP | 0963101 A2 | 12/1999 |
| EP | 1227653 A2 | 7/2002 |
| EP | 1378766 | 1/2004 |

OTHER PUBLICATIONS

Search Report from European Application No. 04101370.7, filed Apr. 2, 2004.

* cited by examiner

*Primary Examiner*—Constantine Hannaher
*Assistant Examiner*—Yara B Green
(74) *Attorney, Agent, or Firm*—Houston Eliseeva LLP

(57) ABSTRACT

A system for reading out X-ray information stored in a phosphor layer, includes: a read-out unit having components for irradiating the phosphor layer with stimulation radiation which can stimulate the phosphor layer to emit emission radiation dependent upon the X-ray information contained in the phosphor layer, and for collecting the emission radiation stimulated in the phosphor layer; and a carrier onto which the read-out unit is mounted. At least one of the components of the read-out unit is mounted onto the carrier over at least one first bearing which has a translatory degree of freedom in a first direction. The first bearing enables movement of the at least one component in relation to the carrier in the first direction.

25 Claims, 2 Drawing Sheets

SYSTEM FOR READING OUT X-RAY INFORMATION STORED IN A PHOSPHOR LAYER

The invention relates to a system for reading out X-ray information stored in a phosphor layer of a medium.

BACKGROUND OF THE INVENTION

X-ray information can be stored in so-called storage phosphors, whereby X-ray radiation passing through an object, for example a patient, is stored as a latent picture in a phosphor layer of a medium. In order to read out the latent picture, the phosphor layer is irradiated with stimulation radiation, and so stimulated into emitting emission radiation. The emission radiation, the intensity of which corresponds to the stored picture, is collected by an optical detector and converted into electric signals. The electric signals are further processed, as required, and finally made available for examination, in particular for medical/diagnostic purposes, whereby they are displayed in corresponding display equipment, eg. a monitor or a printer.

European Patent Application EP 1 378 766 A1, herein incorporated by reference in its entirety for background information only, made known a system, whereby a read-out unit is mounted onto a carrier by means of tapered screws, and this carrier together with the read-out unit is moved over the phosphor layer during read-out. In specific situations, for example where there is jolting, temperature fluctuation or tilting of the carrier while being moved, this can lead to reduction of the quality of the X-ray information read out from the phosphor layer.

SUMMARY OF THE INVENTION

It is the aim of the invention to provide a system of the type mentioned at the outset, which guarantees the highest quality possible of X-ray information read out from the phosphor layer. This problem is solved when at least one component of a read-out unit is mounted on a carrier over at least one first bearing which has a translatory degree of freedom in a first direction, by means of which a movement of the component of the read-out unit in relation to the carrier is made possible in the first direction.

DETAILED DESCRIPTION OF THE PREFERRED EMBODIMENTS

Figure 1:
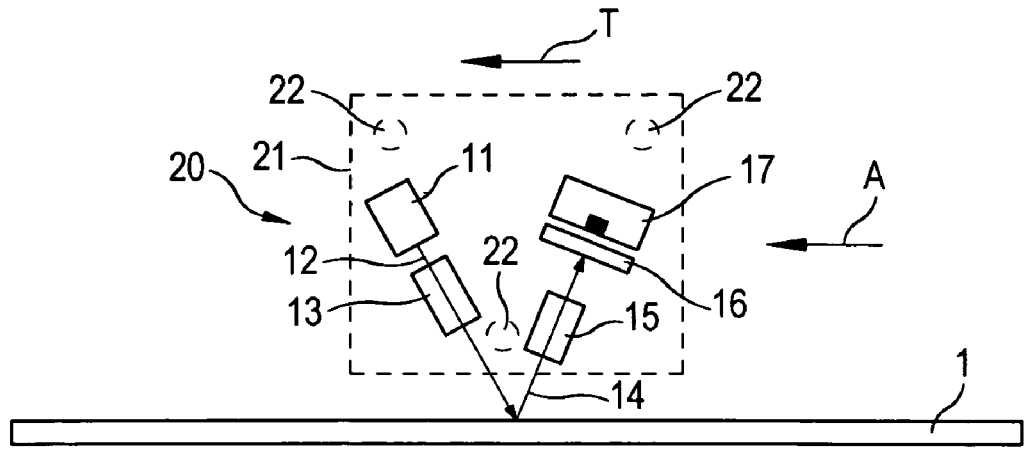
FIG. 1 shows a side view of the system in accordance with the invention.

The invention is based on the idea of mounting one or several components of the read-out unit on the carrier instead of the read-out unit as a whole. The mounting of the individual components on the carrier is carried out over bearings with a translatory degree of freedom. The components of the read-out unit can therefore be moved in the direction of this translatory degree of freedom within a specific movement area, by means of which jolting, changes to length resulting from temperature fluctuations and any tilting of the carrier and twisting resulting from this can be better absorbed or avoided than with systems established by the prior art. In this way, high quality is guaranteed for the reading out of X-ray information stored in the phosphor layer.

In a preferred embodiment of the invention, it is proposed that at least two components of the read-out unit are mounted individually on the carrier over at least a first bearing which respectively has a translatory degree of freedom in a first direction. By means of individual, ie. separate from one another, mounting of the components, it is possible for the individual components to be able to move independently of one another in relation to the carrier. In this way it is prevented that changes in length, twisting or jolts in individual components effect one another, and in certain cases amplify one another. In this way, particularly high quality is guaranteed for the X-ray picture read-out.

With this embodiment, at least two of the following components of the read-out unit are mounted individually and independently of one another in a manner in accordance with the invention:

a stimulation radiation source used to produce stimulation radiation;

a first optical device for focussing the stimulation radiation onto the phosphor layer;

a detector used to collect the emission radiation stimulated by the stimulation radiation in the phosphor layer;

a second optical device for focussing the emission radiation coming from the phosphor layer onto the detector;

a filter device between the phosphor layer and the detector which is essentially penetrable for emission radiation and essentially impenetrable for stimulation radiation.

In another preferred embodiment, it is proposed that the component of the read-out unit has an elongated form in a lengthwise direction which essentially runs parallel to the first direction. In this way, a particularly high improvement in picture quality is achieved because twisting along the lengthwise direction of the component, which is particularly pronounced in the case of thermal expansion lengthwise, can be avoided or at least reduced.

In another embodiment of the invention, the component of the read-out unit has a first end and is mounted over the first bearing onto the carrier in the area of its first end. Preferably, a third bearing with a translatory degree of freedom in the first direction and another translatory degree freedom in a second direction is located in the area of the first bearing, whereby the second direction preferably runs at right angles to the first direction. By means of the additional third bearing, tipping of the component along its lengthwise direction in the area of the first end is prevented, without limiting any further rotatory degree of freedom.

In a further development of the invention, it is proposed that the component of the read-out unit has a second end, and is mounted over a second bearing, which has no translatory degree of freedom, onto the carrier in the area of its second end. In this way it is possible for the component to be mounted so as to be translatorily movable only on a—first—end, whereas at the other—second—end, no translatory movement is possible. This means that thermal expansion of the component is made possible, and at the same time susceptibility to mechanical jolting is reduced.

It is also advantageous to locate a fourth bearing with a translatory degree of freedom in the first direction and a further translatory degree of freedom in a second direction in the area of the second bearing. By means of the fourth bearing, tipping of the component around its lengthwise direction in the area of the second end is prevented, without limiting any further rotatory degree of freedom.

Preferably, the respective bearings are in the form of point bearings. The individual bearings here respectively include in particular a ball, by means of which, in connection with the correspondingly formed carrier or the correspondingly formed component, the different degrees of freedom for the corresponding components can be provided. By the use of balls as point bearings, the advantage is achieved at the same time, that rotatory degrees of freedom at right angles to the lengthwise direction of the respective component are generally maintained and only by means of the third bearing and/or fourth bearing described above around a rotatory degree of freedom, namely the tipping around the lengthwise direction of the component, can be reduced.

In another preferred embodiment of the invention, it is proposed that the carrier includes two side sections onto which at least one component of the read-out unit is mounted. The side sections have corresponding supports for this, for example in the form of projections or indentations. Both side sections are connected to one another by means of one or several connecting elements. Preferably, three connecting elements are provided for this in order to guarantee the most stable connection possible of both side sections, with at the same time a small number of connecting elements. The connecting elements are preferably made from a synthetic or from a synthetic reinforced by fibres, in particular glass or carbon fibres. In this way, a carrier with high stability and at the same time a low weight can be produced.

Preferably, the connecting elements have a lower thermal expansion coefficient than the components of the read-out unit. In this way, in the case of temperature deviations, the carrier remains relatively rigid in comparison with the individual components of the read-out unit, ie. thermal changes to the length of the carrier are negligible in comparison to those of the individual components.

Preferably, the connecting elements are elongated in form and have a cross-sectional profile which stabilizes the elongated form. The cross-sectional profile here is preferably in the form of a v, polygonal or circular. This means that there is a reduction in the amount of material used, and so also of weight, and so the carrier can be extremely rigid.

Another preferred embodiment of the invention proposes that at least one component of the read-out unit is made up from two or more part components with different thermal expansion coefficients, and the part components are arranged and connected together in such a way that any bending forces arising between both respective part components of this component as a result of changes in temperature cancel one another out, whereby bending of the component can be avoided. The component of the read-out unit is constructed in such a way that any "bimetallic effects" in the area of the contact surface of two part components of different materials can be prevented.

With a variation of this embodiment, the part components of the component can be mechanically coupled. This is achieved, for example, by using an elastic connection, eg. an elastic layer of adhesive, between the part components, by means of which movement of the part components in relation to one another—at least within specified limits—is possible.

By means of this moveability of the part components in relation to one another, the occurrence of tensions and in certain cases bending forces in the component as a result of different thermal expansion coefficients is avoided in a simple manner.

The system in accordance with the invention preferably has a holding device onto which the carrier is mounted, and which can move the carrier over the phosphor layer. Because the individual components of the read-out unit can be inserted into the carrier on the production side, and can be adjusted, the carrier together with the components can be inserted into the holding device with relatively little assembly and adjustment expenditure. Re-adjustment of the components when the carrier is inserted, or after insertion into the holding device can therefore generally be dispensed with. In this way, it is possible to change the complete read-out unit for repairs and servicing in a simple manner.

Preferably, the carrier is mounted onto the holding device over at least a fifth bearing which has a translatory degree of freedom in the first direction, so that movement of the carrier in the first direction is made possible. In this way it is guaranteed that the carrier can also move in relation to the holding device in the first direction, and in particular, can expand. In this way, tensions as a result of jolting or thermal expansion of the carrier can be avoided.

FIG. 1 shows a side view of the system in accordance with the invention for reading out X-ray information stored in a phosphor layer 1. The system has a read-out unit which includes the following components:

a stimulation radiation source 11 used to produce stimulation radiation 12;

a first optical device 13 used to focus the stimulation radiation 12 onto the phosphor layer 1;

a detector 17 used to collect the emission radiation 14, and which is stimulated by the stimulation radiation 12 in the phosphor layer 1;

a second optical device 15 used to focus the emission radiation 14 onto the detector 17; and a filter device 16 which is essentially penetrable for emission radiation 14 and essentially impenetrable for stimulation radiation 12.

Preferably, the read-out unit is in the form of a so-called line sensor whereby the stimulation radiation source 11 is in the form of a line light source which, for example, includes a number of laser diodes arranged in a line at right angles to the plane of the figure. In this case, the detector 17 has a number of radiation-sensitive surfaces which are also arranged in a line at right angles to the plane of the figure, for example in the form of a so-called CCD Array.

The first optical device 13 is one or more cylinder lenses running at right angles to the plane of the figure, and which focus the stimulation radiation 12 onto the phosphor layer 1 on the plane of the figure. The same applies for the second optical device 15, whereby this has in addition a lens array which also runs at right angles to the plane of the figure, and which brings about focussing of the emission radiation 14 coming from the phosphor layer 1 onto the individual light-sensitive elements of the detector 17 at right angles to the plane of the figure.

The specified components of the read-out unit are set on a bearer 20, which is itself coupled to a holding device (not illustrated), and can be guided by this in conveyance direction T over the phosphor layer 1. In so doing, by means of the conveyed read-out device, successive different areas of the phosphor layer 1 can be read out, whereby an X-ray picture stored in the phosphor layer 1 can be read out.

The carrier 20 includes two side parts 21 of which only one can be identified in the side view chosen here. For stable mechanical connection of the side parts 21, three connecting elements 22 are provided, and these are preferably pipes made from glass or carbon fibre reinforced synthetic.

Figure 2:
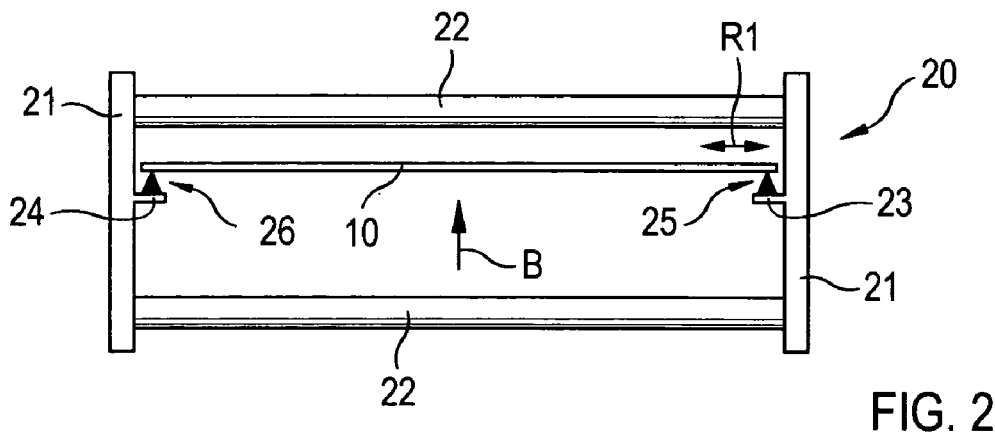
FIG. 2 shows a front view of a first embodiment of the system in accordance with the invention.

FIG. 2 shows a front view of a first embodiment of the system shown in FIG. 1, in viewing direction A. In order to better clarify the principle which forms the basis of the discovery, just one highly schematised component 10 of the read-out device from FIG. 1 is shown here. The following embodiments relating to this component 10 also apply correspondingly for one or several of the components 11, 13, 15, 16 and 17 of the read-out device shown in FIG. 1.

In this view, both side parts 21 of the carrier 20 and the connection of the same by means of the connecting elements 22 can be easily identified. In the embodiment shown as an example, the side parts 21 have projections 23 and 24, onto which the component of the read-out unit is mounted by means of a first bearing 25 and a second bearing 26.

In accordance with the invention, the first bearing 25 is formed such that the same has a translatory degree of freedom in a first direction R1, by means of which movement of the component 10 in relation to the carrier 20 in the first direction R1 is made possible. The other end of the component 10 is mounted over a second bearing 26 on the projection 24 of the side part 21, whereby the second bearing 26 has no translatory degree of freedom in the first direction R1. By means of this mounting of the component 10 over the first bearing 25 and the second bearing 26, it is possible for the component 10 to deviate in the first direction R1 with simple and reliable locking in the second bearing 26 at the same time as the occurrence of jolting or changes in length as a result of temperature fluctuations. In this way, undesired tensions in the component 10 of the read-out unit can be prevented, or at least reduced.

Figure 3:
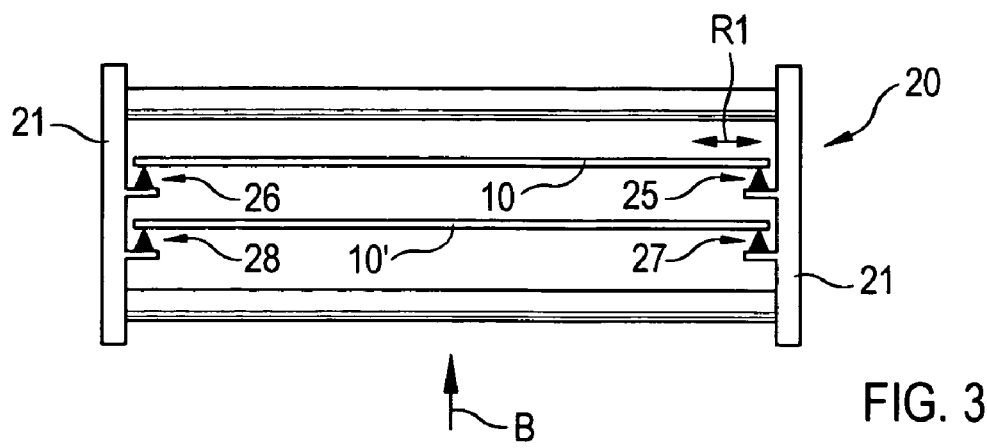
FIG. 3 shows a front view of a second embodiment of the system in accordance with the invention.

FIG. 3 shows a front view of a second embodiment of the system in accordance with the invention, whereby two components 10 and 10' are mounted on the carrier 20 individually, ie. independently of one another. Each of the components 10 and 10' here is respectively mounted over a first bearing 25 or 27 and a second bearing 26 or 28 on the side parts 21 of the carrier 20. The first two bearings 25 and 27 are formed in such a way, in accordance with the invention, that they have a translatory degree of freedom in the first direction R1, and thus allow movement of the respective components 10 and 10' in relation to the carrier 20 in the first direction R1. Because the two components 10 and 10' are respectively mounted individually and independently of one another on the carrier 20, the movements of the same in the first direction R1 happen independently of one another. The components 10 and 10' are therefore separate from one another, such that any twisting as a result of different thermal expansion coefficients can be avoided.

In the example illustrated, the two first bearings 25 and 27 are located respectively on the same (in FIG. 3: on the right) end of the respective components 10 and 10'. With certain applications it can be an advantage if the first bearing 25 of the one component 10 and the first bearing 27 of the other component 10' is located on the opposite ends (in FIG. 3: on the right or on the left end) of the respective components 10 and 10'.

Figure 4:
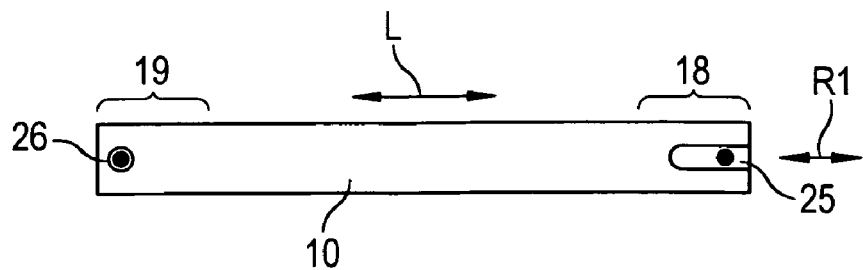
FIG. 4 shows a view of one of the components shown in FIGS. 2 and 3 in viewing direction B.

FIG. 4 shows a view of the component 10 shown in FIGS. 2 and 3, in viewing direction B. As can be seen, the component 10 is of elongated form which extends parallel to a lengthwise direction L. The first bearing 25 is located in the area of a first end 18 of the component 10, whereas the second bearing 26 is located in the area of a second end 19 of the component 10. As can also be seen from the illustration, the lengthwise direction L, along which the elongated form of the component 10 extends, and the first direction R1, in which the component 10 can move, run parallel to one another. This is particularly advantageous so as to avoid twisting arising from changes in length as a result of temperature fluctuations. The first and second bearing 25 and 26 are only schematically shown in the illustration chosen here. Its structure will be described in greater detail below, in connection with FIG. 5.

Figure 5:
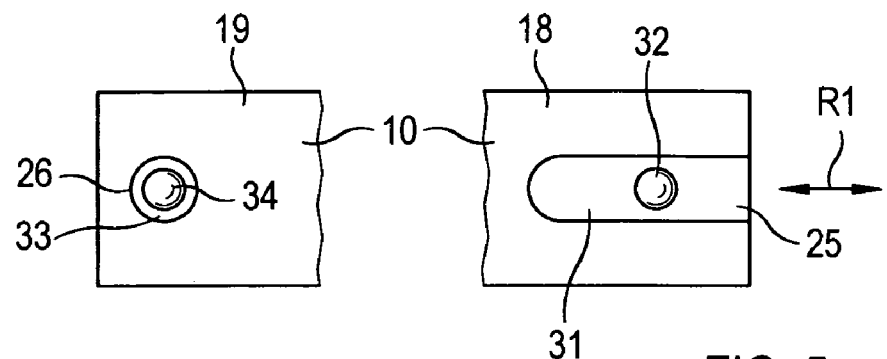
FIG. 5 shows both ends of the component shown in FIG. 4, enlarged.

FIG. 5 shows both ends 18 and 19 respectively as an enlarged section of the component 10 shown in FIG. 4. The first bearing 25 located in the area of the first end 18 of the component 10 includes a groove 31 made in the component 10 and a ball 32 which can move in the groove 31 in the first direction R1, for example by rolling and/or sliding. In the area of the second end 19 of the component, a circular cutout 33 is provided, into which a ball 34 can be partially sunk. By means of a corresponding cutout in the support, in particular the projection 24 on the side part 21 (see FIG. 2) it is possible for the second bearing 26 to have no translatory degree of freedom. Moreover, by means of the second bearing 26 shown here, rotational degrees of freedom of the component 10 are maintained around a rotation axis running parallel to the first direction R1 and around an axis running at right angles to the rotation axis on the plane of the figure.

Figure 6:
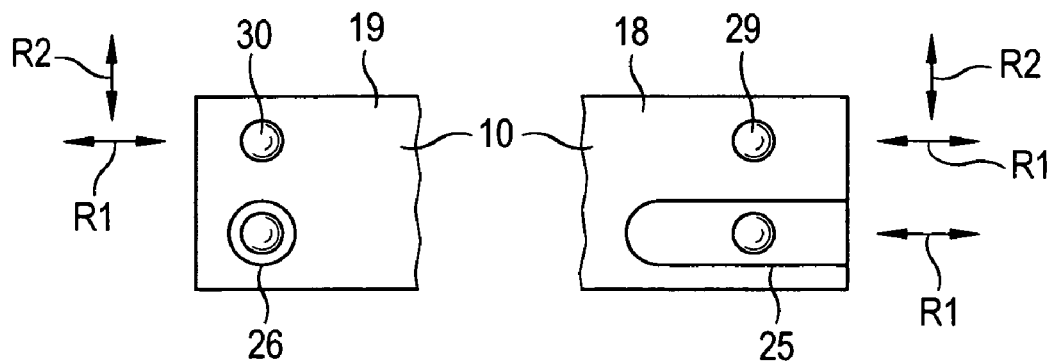
FIG. 6 shows both ends of an embodiment of the component shown in FIG. 4, enlarged.

FIG. 6 shows both ends 18 and 19 of an embodiment of the component 10 shown in FIG. 4, enlarged. In the area of the first end 18 of the component 10, in addition to the first bearing 25, a third bearing 29 is provided which has a translatory degree of freedom both in the first direction R1 as well as a translatory degree of freedom in a second direction R2. The third bearing 29 can be created easily by means of a ball on which the first end 18 of the component 10 lies and which is partially sunk into a circular indentation in the support, in particular a projection 23 of the side part 21 of the carrier 20 (see FIG. 2). By means of the third bearing 29 in the area of the first bearing 25, tipping of the first end 18 of the component 10 around an axis of rotation running parallel to the lengthwise direction L of the component 10 is prevented. In this way, tensions in the component 10 at the same time as high tipping stability can be prevented or reduced.

Also in the area of the second end 19 of the component 10, a fourth bearing 30 with two translatory degrees of freedom in the first and second direction R1 and R2 can be provided in addition to the second bearing 26. By means of this, the tipping stability in relation to a rotation axis running parallel to the lengthwise direction L is guaranteed with particularly high reliability.

Figure 7:
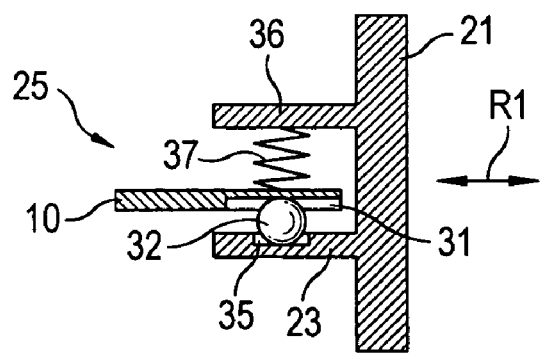
FIG. 7 shows a section from a side part of the carrier.

FIG. 7 shows a section from the right-hand side part 21 of the carrier with one embodiment for the first bearing 25 in accordance with the invention. With this embodiment as an example, the component 10 is mounted over a ball 32 on the projection 23 of the side part 21. Here, the ball 32 lies in an indentation 35 made in the projection. At the same time, the ball 32 lies in the groove made in the component 10 which acts as a guide. The component 10 is pre-tensioned by means of a spring 37 against the ball 32 in order to avoid an undesired jumping out of the ball and/or the component 10 from the bearing. The spring 37 for this purpose is preferably set on another projection 36 of the side part 21.

The second, third and fourth bearings 26, 29 and 30 are created in a corresponding manner, whereby with the second bearing 26, the guide groove 31 is replaced by a round indentation, similar to the indentation 35, and with the third and fourth bearing 29 and 33, the optical component 10 generally has no indentation or guide groove.

The invention claimed is:

1. A system for reading out X-ray information stored in a phosphor layer, the system comprising:
   a read-out unit comprised of at least a first component and a second component for irradiating the phosphor layer with stimulation radiation, which can stimulate the phosphor layer to emit emission radiation dependent upon the X-ray information contained in the phosphor layer, and for collecting the emission radiation stimulated in the phosphor layer; and
   a carrier onto which the first component and the second component of the read-out unit are mounted adjacent to the phosphor layer, the carrier and the first component and the second component of the read-out unit being moved relative to the phosphor layer in a conveyance direction during the irradiation of and collection of emission radiation from the phosphor layer;
   wherein each of the first component and the second component of the read-out unit is mounted onto the carrier at a first end by a first bearing and a third bearing and at a second end by a second bearing and a fourth bearing, wherein the first bearing has a single translatory degree of freedom in a first direction, which is orthogonal to the conveyance direction, the second bearing has no translatory degrees of freedom, and the third bearing and the fourth bearing each have tow translatory degrees of freedom, one being in the first direction and the other being in a second direction that is perpendicular to the first direction, said first bearing and the third bearing enabling movement of the first component and the second component in relation to the carrier and in relation to each other in the first direction and the third bearing and the fourth bearing enabling movement of the first component and the second component in relation to the carrier while preventing tipping of the first component and the second component around an axis extending parallel to the first direction.

2. The system in accordance with claim 1, further comprising the first component and the second component being of elongated form extending in a lengthwise direction, whereby the lengthwise direction runs parallel to the first direction.

3. The system in accordance with claim 1, wherein the carrier further comprises two side parts onto which said first component and the second component of the read-out unit are mounted.

4. The system in accordance with claim 3, wherein the carrier further comprises one or more connecting elements to connect the two side parts with one another.

5. The system in accordance with claim 4, further comprising the connecting elements being made from a synthetic reinforced by fibres.

6. The system in accordance with claim 4, further comprising the connecting elements having a lower thermal expansion coefficient than the components of the read-out unit.

7. The system in accordance with claim 4, further comprising the connecting elements being of elongated form and having a profile which stabilizes the elongated form, the profile being cross-sectional, V-shaped, or polygonal.

8. The system in accordance with claim 1, further comprising said at least one of the first component and the second component of the read-out unit being made up from two or more part components with different thermal expansion coefficients, and the part components are arranged and connected to one another in such a way that bending forces arising from changes in temperature between two respective part components of the at least one component check one another, so that bending of the component is avoided.

9. The system in accordance with claim 1, further comprising a holding device, onto which the carrier is mounted, for moving the carrier over the phosphor layer.

10. The system in accordance with claim 9, further comprising the carrier on the holding device being mounted over at least a fifth bearing having a translatory degree of freedom in the first direction, said fifth bearing enabling movement of the carrier in relation to the holding device in the first direction.

11. A system for reading out X-ray information stored in a phosphor layer, the system comprising:
    a read-out unit comprised of components for irradiating the phosphor layer with stimulation radiation, which can stimulate the phosphor layer to emit emission radiation dependent upon the X-ray information contained in the phosphor layer, and for collecting the emission radiation stimulated in the phosphor layer; and
    a carrier onto which the read-out unit is mounted, the carrier comprising opposed side parts and connecting elements extending between the side parts in a first direction, the read-out unit and the carrier being moved relative to the phosphor layer in a conveyance direction during the irradiation of and collection of emission radiation from the phosphor layer, the conveyance direction being orthogonal to the first direction;
    wherein at least one of said components of the read-out unit is mounted onto the carrier at a first end by a first bearing and a third bearing and at a second end by a second bearing and a fourth bearing, wherein the first bearing has a single translatory degree of freedom in a first direction, the second bearing has no translatory degrees of freedom, and the third bearing and the fourth bearing each have tow translatory degrees of freedom, one being in the first direction and the other being in a second direction that is perpendicular to the first direction, said first bearing and the third bearing enabling movement of the at least one of said components in relation to the carrier in the first direction and the third bearing and the fourth bearing enabling movement of the at least one of said components in relation to the carrier while preventing tipping of the at least one of said components first component and the second component around an axis extending parallel to the first direction.

12. The system in accordance with claim 11, wherein the read-out unit further comprises at least two components that are mounted individually on the carrier respectively, wherein the movements of the at least two components are independent of one another.

13. The system in accordance with claim 11, further comprising the at least one component being of elongated form extending in a lengthwise direction, whereby the lengthwise direction runs parallel to the first direction.

14. The system in accordance with claim 11, wherein the carrier further comprises tow side parts connected together by the connecting elements.

15. The system in accordance with claim 11, further comprising the connecting elements being made from a synthetic reinforced by fibres.

16. The system in accordance with claim 11, further comprising the connecting elements having a lower thermal expansion coefficient than the components of the read-out unit.

17. The system in accordance with claim 11, further comprising the connecting elements being of elongated form and having a profile which stabilizes the elongated form, the profile being cross-sectional, V-shaped, or polygonal.

18. The system in accordance with claim 11, further comprising said at least one component of the read-out unit being made up from two or more part components with different thermal expansion coefficients, and the part components are arranged and connected to one another in such a way that bending forces arising from changes in temperature between two respective part components of the at least one component check one another, so that bending of the component is avoided.

19. The system in accordance with claim 11, further comprising a holding device, onto which the carrier is mounted, for moving the carrier over the phosphor layer.

20. The system in accordance with claim 4, further comprising the connecting elements being made from a synthetic reinforced by glass.

21. The system in accordance with claim 4, further comprising the connecting elements being made from a synthetic reinforced by carbon fibres.

22. The system in accordance with claim 4, wherein each of the first bearing, second bearing, third bearing and fourth bearing comprises:
   a ball that is mounted between the carrier and a respective one of the first component and the second component; and
   a spring that urges the ball into contact with both the carrier and the respective one of the first component and the second component.

23. The system in accordance with claim 11, further comprising the connecting elements being made from a synthetic reinforced by glass.

24. The system in accordance with claim 11, further comprising the connecting elements being made from a synthetic reinforced by carbon fibres.

25. The system in accordance with claim 11, wherein each of the first bearing, second bearing, third bearing and fourth bearing comprises:
   a ball that is mounted between the carrier and the at least one of the components; and
   a spring that urges the ball into contact with both the carrier and the at least one of the components.

* * * * *

UNITED STATES PATENT AND TRADEMARK OFFICE
CERTIFICATE OF CORRECTION

PATENT NO. : 7,498,598 B2
APPLICATION NO. : 11/079653
DATED : March 3, 2009
INVENTOR(S) : Volker Melzer et al.

Page 1 of 1

It is certified that error appears in the above-identified patent and that said Letters Patent is hereby corrected as shown below:

In column 7, claim 1, line 26, delete "tow" and insert --two--.

In column 8, claim 11, line 33, delete "tow" and insert --two--.

In column 8, claim 14, line 55, delete "tow" and insert --two--.

Signed and Sealed this

Nineteenth Day of May, 2009

JOHN DOLL
*Acting Director of the United States Patent and Trademark Office*